3,459,557
PROCESS FOR MANUFACTURE OF READILY DISPERSIBLE COCOA POWDER

Tamotsu Ohashi, Kotaro Masuda, Masatake Imai, and Takeshi Morishima, Mishima-shi, Japan, assignors to Morinaga Confectionery Co., Ltd., Tokyo, Japan, a company of Japan
No Drawing. Filed Apr. 6, 1966, Ser. No. 540,529
Claims priority, application Japan, Sept. 28, 1965, 40/59,087
Int. Cl. A23g 1/00
U.S. Cl. 99—26         4 Claims

ABSTRACT OF THE DISCLOSURE

Cocoa powder is rendered readily dispersible by de-airing powdered cocoa in a vacuum chamber and coating the de-aired particles with a hydrophilic surfactant by spraying same onto the cocoa particles in the form of a solution thereof.

---

This invention relates to a process for the manufacture of readily dispersible cocoa powder.

Pure cocoa, manufactured by drying cocoa beans and crushing same into powder after removing cocoa butter therefrom, is a drink with specific flavor. However, the powder itself is not easily dispersible in water because of the fat remaining therein. In order to obtain a good cocoa drink, it is therefore necessary to first wet the powder with warm water, knead it and then stir it by adding sweetened, condensed milk, sugar and hot water.

Further, a prepared cocoa drink which is a mixture of cocoa powder, sugar and powdered milk, becomes lumpy when it is dissolved in either cold water or hot water, and in the addition, the rate at which the powder is wetted by a solvent or disperses in the solvent is very slow, indicating that there is difficulty in wettability of the powder. This is even more so when cows milk is used as the solvent.

Generally speaking, the fat content of cocoa is in the range of 10–25% and one of the factors greatly influencing the wettability of cocoa powder is the fat on the surface of the cocoa. This is evident from that fact that when the temperature of the water is lower than the melting point of the fat, cocoa containing a larger amount of fat is more difficulty wetted than cocoa containing a smaller amount of fat.

In the prior art, it is usually intended to obtain a readily dispersible cocoa with the three components, namely, fat, surfactant and water, wherein the binding of the surfactant to the cocoa is effected with a mixing machine. However, since the specific surface area of cocoa ranges to as much as 2.4 m.$^2$/g., it is hardly possible to attach the surfactant onto the entire surface area of the cocoa by means of a mixing machine only.

As a result of studies by the present inventors it has been discovered that, in addition to the fat on the surface of the cocoa, there are an amount of polysaccharide CH groups larger than the amount of OH or CO groups on the surface of the cocoa which also causes a lowering of the hydrophilic activity of cocoa and influences the wettability of cocoa. A further factor influencing the wettability of cocoa is the complicated capillary structure in or between the cocoa particles which structure allows for the existence of air making it difficult for water to flow into the cocoa, ultimately resulting in difficulty of wetting the cocoa.

The object of this invention is to provide a process for the production of hydrophilic and readily dispersible cocoa powder by having hydrophilic surfactants in solution absorbed onto the surface of the cocoa after removing the air which is strongly attached to the surface of the cocoa. Thus, there is obtained cocoa powder having a hydrophilic surface, an extremely fine surface roughness and also having an actual surface area only one-tenth as much as the apparent surface area. To the cocoa powder thus obtained, sweetening agents such as sugar or dextrose are added to make a readily soluble drink.

The present process is intended to remove the air attached to the surface of the cocoa by placing the cocoa powder under a reduced pressure in a vacuum pump and after de-airing the cocoa spraying by means of a nozzle, a pre-warmed solution of a surfactant into the chamber in the form of an extremely fine spray, thereby covering the entire surface of the cocoa powder with a hydrophilic surfactant. The surfactant must be dissolved in advance in an easily-evaporable inert solvent such as ethanol to reduce the viscosity and it must be warmed prior to spraying into the chamber so as to obtain a thorough dispersion thereof. In this case, heating the chamber helps to obtain a better result. After spraying, the remainder of the ethanol is removed under reduced pressure, whereby an extremely thin film of hydrophilic surfactant is formed over the entire surface of the cocoa powder, and thus the cocoa acquires excellent wettability.

Substances which can be used as the surfactants in this invention are propylene glycol monolaurate, propylene glycol monomyristate, propylene glycol monostearate, propylene glycol monopalmitate, sorbitan monooleate sorbitan monostearate, sorbitan monlaurate, sorbitan monopalmitate, glycerine monostearate, glycerine monooleate, glycerine monomyristate, glycerine monolaurate, lecithin, propylene glycol or mixtures of the above substances.

The pretreatment of the cocoa powder according to the invention makes it possible to remove the air which is absorbed by the cocoa powder and at the same time to cover not only the fatty part of the cocoa but also the hydrophobic surface of the non-fatty part with hydrophilic surfactants, and thus the cocoa particles are provided with hydrophilic activity.

This treated cocoa powder can be used as either the pure cocoa product or the raw material of the prepared cocoa drink, which is a mixture made by mixing sugar and powdered milk to the cocoa powder.

The present invention is hereinafter explained in detail, having reference to the following example.

Twenty parts of cocoa powder are placed in a vacuum chamber and 0.1 part each of sorbitan monolaurate and glycerin monolaurate mixed and dissolved in 0.6 part of ethanol are sprayed into the vacuum chamber heated to a temperature of 80° C. in order to have the cocoa powder adsorb the sprayed surfactant and thereby obtain a readily dispersible cocoa powder.

A prepared cocoa drink can be manufactured from this pretreated cocoa in the following manner. The whole quantity of the pretreated cocoa powder obtained in the present process is mixed with a primary mixture containing vitamins and others as well as 20 parts of sugar and further 0.1 part of spices is evenly dispersed and mixed, and additional 40 parts of sugar are mixed with this secondary mixture.

What we claim is:

1. A process for producing dispersible cocoa powder, said process comprising subjecting cocoa powder to a vacuum to thereby remove air trapped between particles of said cocoa powder and coating the vacuum treated particles of cocoa powder with a hydrophilic surfactant by spraying a warm inert solvent solution of said surfactant on said cocoa powder while maintaining said vacuum.

2. A process as claimed in claim 1, wherein the surfactant is at least one member selected from the group consisting of propylene glycol monolaurate, propylene glycol monomyristate, propylene glycol monostearate, propylene glycol monopalmitate, sorbitan monooleate, sorbitan monostearate, sorbitan monolaurate, sorbitan monopalmitate, glycerine monostearate, glycerine monooleate, glycerine monomyristate, glycerine monolaurate, lecithin and propylene glycol.

3. A process as claimed in claim 1, wherein the inert solvent is ethanol.

4. A process as claimed in claim 1, wherein the spraying of the solution is effected at 80° C.

References Cited

UNITED STATES PATENTS

| 2,953,458 | 9/1960 | Sjollema | 99—56 |
| 3,085,879 | 4/1963 | Wadsworth et al. | 99—26 |
| 3,120,438 | 2/1964 | McIntire et al. | |

ALVIN E. TANENHOLTZ, Primary Examiner

WILLIAM C. LAWTON, Assistant Examiner

U.S. Cl. X.R.

99—25, 78; 117—119